United States Patent

Kübert et al.

[11] Patent Number: 5,279,498
[45] Date of Patent: Jan. 18, 1994

[54] BEARING JOURNALS FOR PAPER GUIDE ROLLERS

[75] Inventors: Thomas Kübert, Karlstadt-Karlburg; Erhard H. Glöckner, Eibelstadt, both of Fed. Rep. of Germany

[73] Assignee: Koenig & Bauer Aktiengesellschaft, Wurzburg, Fed. Rep. of Germany

[21] Appl. No.: 966,548

[22] Filed: Oct. 26, 1992

[30] Foreign Application Priority Data

Oct. 24, 1991 [DE] Fed. Rep. of Germany ....... 4135102

[51] Int. Cl.⁵ ...................... F16C 13/02; F16C 43/00; B65H 20/00; F16B 2/14
[52] U.S. Cl. ..................................... 384/538; 226/194; 403/374; 384/419
[58] Field of Search ............... 384/416, 419, 428, 439, 384/538, 537; 403/375, 374, 354; 226/194, 190, 44

[56] References Cited

U.S. PATENT DOCUMENTS

| | | | |
|---|---|---|---|
| 1,662,715 | 3/1928 | Morrow | 403/374 |
| 2,496,402 | 3/1946 | McVeigh et al. | |
| 2,947,409 | 8/1960 | Dodge, Jr. et al. | 403/374 X |
| 4,861,173 | 8/1989 | Kemp | 384/538 |

FOREIGN PATENT DOCUMENTS

| | | |
|---|---|---|
| 318093 | 3/1917 | Fed. Rep. of Germany. |
| 2211598 | 3/1972 | Fed. Rep. of Germany. |
| 7507904 | 6/1976 | Fed. Rep. of Germany. |
| 1177560 | 6/1957 | France. |
| 294667 | 7/1928 | United Kingdom ................ 384/537 |

*Primary Examiner*—Thomas R. Hannon
*Attorney, Agent, or Firm*—Jones, Tullar & Cooper

[57] ABSTRACT

A bearing journal for a paper guide roller has a blind bore extending inwardly from an axial outer end. The blind bore carries cooperating clamping wedges which are slidable with respect to each other to thereby radially expand an annular clamping area of the bearing journal into engagement with a side wall of the printing press.

10 Claims, 2 Drawing Sheets

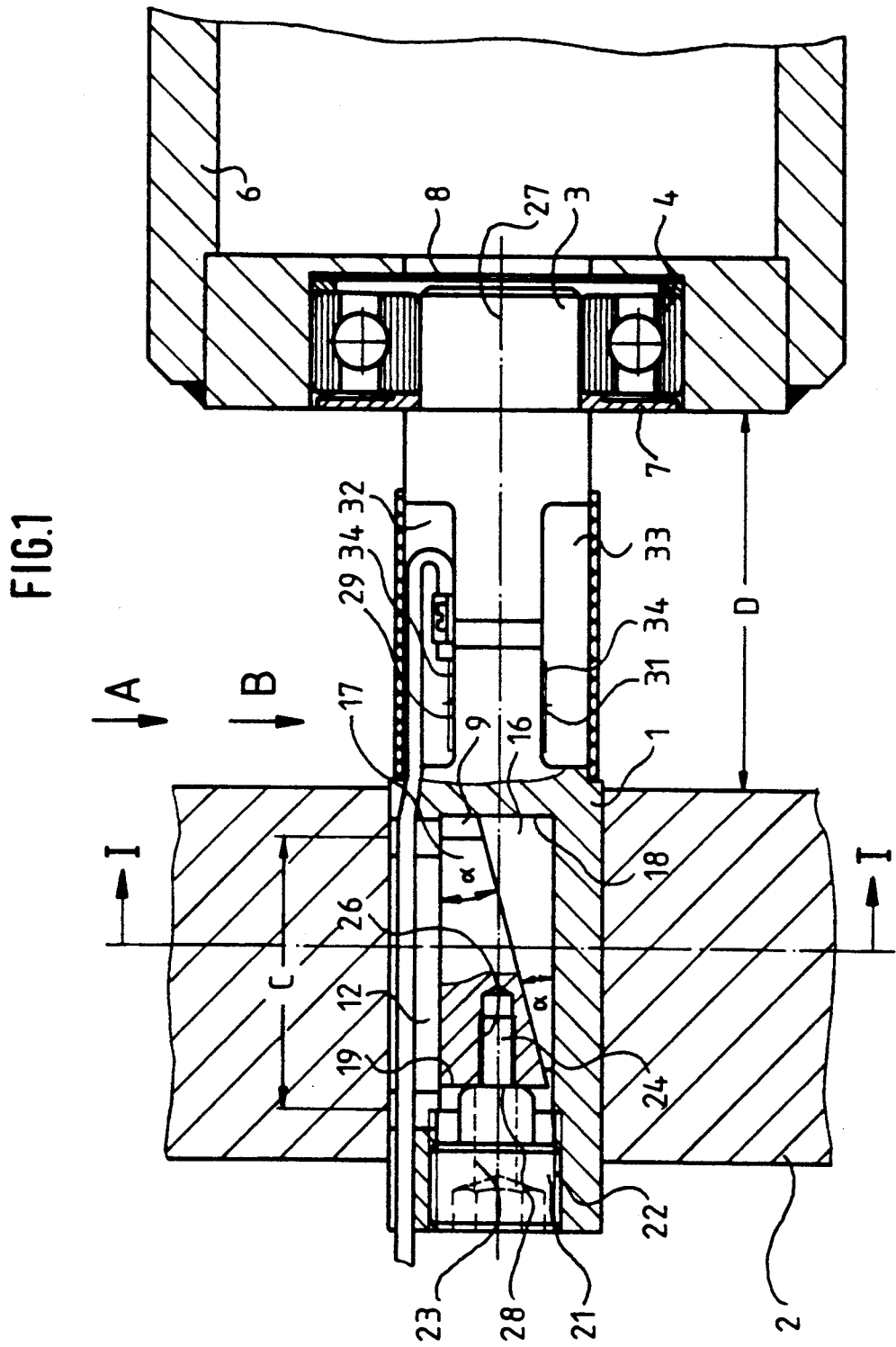

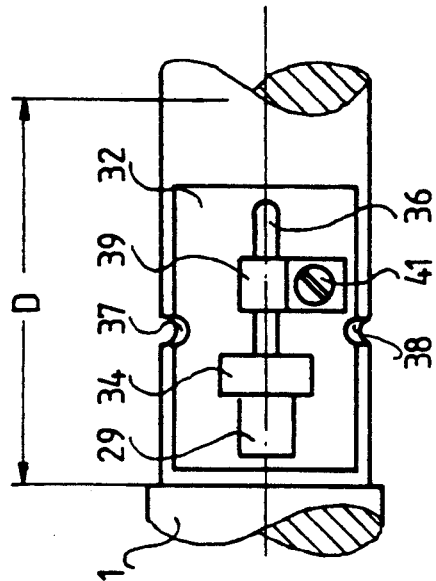
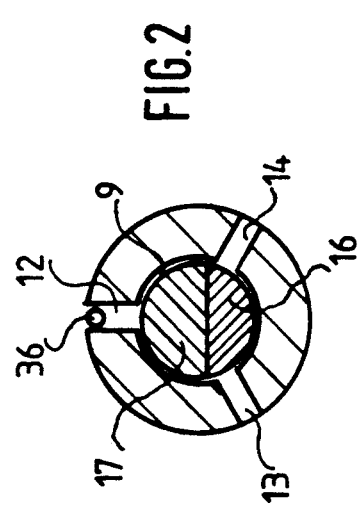
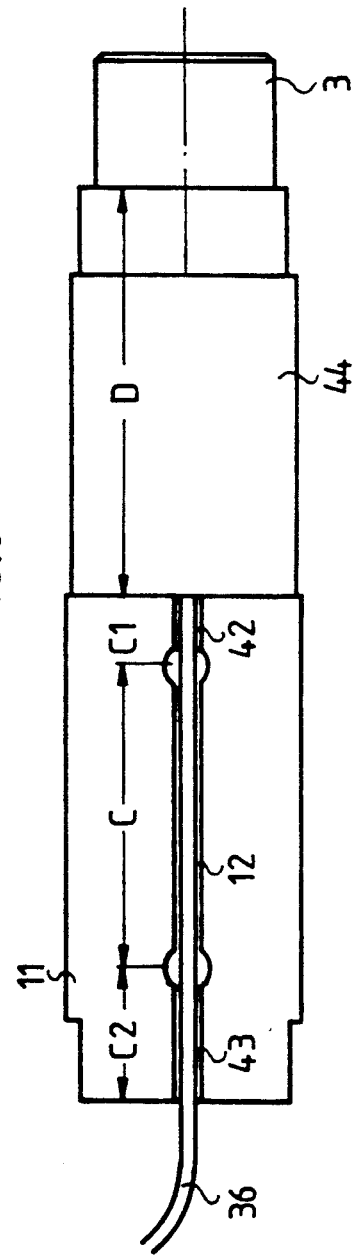

BEARING JOURNALS FOR PAPER GUIDE ROLLERS

FIELD OF THE INVENTION

The present invention is directed generally to bearing journals for paper guide rollers. More particularly, the present invention is directed to bearing journals for paper guide rollers of rotary printing presses. Most specifically, the present invention is directed to bearing journals for paper guide rollers which receive wire strain gauges. These strain gauges are used to measure a force exerted on the bearing journal of the paper guide roller which force is an indication of the paper web tension. These measured forces can be amplified by suitable converters. The measured value is indicated by suitable means and if the paper web tension deviates from a previously set value, a warning signal can be triggered. The bearing journals are securable in press side frames having various thicknesses.

DESCRIPTION OF THE PRIOR ART

Bearing journals of various paper guide rollers are typically secured in spaced side frames of rotary printing machines. The paper web which is to be printed, or which has been printed is guided through the printing press assembly by passing over and around these paper guide rollers. It has been found that the tension of the paper web can be measured by use of suitable measuring devices, such as wire strain gauges and the like which are attached to the bearing journals of the paper web guide rollers.

One such device for controlling paper web tension in web-fed rotary printing presses is shown in German Letters Patent No. DE-PS 22 11 598. In this device a paper guide is disposed between two printing units and has wire strain gauges in the bearing journals. These wire strain gauges are used for measuring tension changes of higher frequency of the paper web. The measured values derived from these wire strain gauges are converted into electrical values, are indicated on suitable display devices and are provided to a switch device which triggers various signals and control assemblies so that any changes in the tension in the paper web can be smoothed out. In this prior art device, the journal bearings for the paper guide roller are secured in the press frame by nuts and counter nuts.

A limitation of this prior art assembly is that this type of fastening of the bearing journal in the press frame requires the coordinated efforts of two people, one on either side of the press frame when the bearing journal is installed or removed. A further possible problem can occur during installation of the bearing journal because the journal may become twisted or may rotate in the press frame. Since the bearing journal and the strain gauge that it carries are required to be placed in a specific, defined position for the readings derived therefrom to be accurate, this twisting may render the readings inaccurate. The proper position of the strain gauge is determined by the resultant forces generated by the looping of the paper web around the guide roller and the disposition of the wire strain gauge. This proper position can not be assured if the bearing journal is twisted or rotated and can then be achieved only with a great degree of difficulty. The best efficiency of the wire strain gauges is obtained when they are disposed in a plane which is generally perpendicular to the direction of application of the resultant forces discussed above. Thus it is again very important for the bearing journal to be properly oriented so that the forces will pass at a right angle through the strain gauge.

Another limitation of this prior art device is the need to provide a plurality of bearing journals of various lengths. Since the side frames of the printing press are apt to vary from press to press and even at various points in a single press, it is necessary to keep bearing journals of various lengths, which correspond to the several thicknesses of the side walls or frames of the press assembly available.

Another arrangement that is used to seat paper web guide rollers that sense the tension in the paper web in a rotary printing press is shown in the German Utility Model No. DE-GM 75 07 904. In this prior art arrangement, the paper guide rollers have bearing journals which are equipped with wire strain gauges for performing measurements of the tension of the paper web. These bearing journals are secured in bearing blocks on the press frame. In this prior art device, these bearing blocks for the bearing journals have play in their fastening elements. This play results in inaccuracies when the rollers are installed. Such inaccuracies can easily lead to, and result in untrue running of the paper web in the guide rollers and errors in reading of the web.

It will be apparent that a need exists for a journal that can be quickly and accurately mounted in various press side walls while insuring the accurate positioning of the wire strain gauge or gauges used to measure paper web tension. The bearing journals for paper guide rollers in accordance with the present invention provide such assemblies and overcome the limitations of the prior art devices.

SUMMARY OF THE INVENTION

It is an object of the present invention to provide a bearing journal for a paper guide roller.

Another object of the present invention is to provide a bearing journal for a paper guide roller in a rotary printing press.

A further object of the present invention is to provide a bearing journal for a paper guide roller which supports strain gauges.

Yet another object of the present invention is to provide a bearing journal for a paper guide roller which can be secured in a press frame regardless of the thickness of the frame.

Still a further object of the present invention is to provide a bearing journal for a paper guide roller which is easy to rotate in the press frame.

Even yet another object of the present invention is to provide a bearing journal for a paper guide roller that can be easily installed in the press frame.

As will be discussed in detail in the description of the preferred embodiment which is set forth subsequently, the bearing journal for a paper guide roller utilizes a bearing journal outer end that has a blind bore and a plurality of radially outwardly directed, longitudinally extending, circumferentially spaced slots. These slots allow the annular portion of the bearing journal in the clamping area which will be placed in the press side frame to be expanded radially outwardly into clamping engagement with the side frame. This radial expansion is caused by a pair of sliding wedges that are disposed in the blind bore. These sliding wedges are self-locking and an adjusting screw is used in conjunction with a pressure screw to move the wedges with respect to each other to either increase or decrease the clamping forces. Opposing wire strain gauges are positioned in recesses between the clamping area of the bearing journal and the paper guide roller. These wire strain gauges have their lead wires extending out of the bearing journals through one of the spaced slots.

A primary advantage of the bearing journal assembly of the present invention is its adaptability to various press frames having a wide range of thicknesses. The bearing journal can be secured in the press side frame, without regard to the disposition of a flange or a thread; i.e. without the need of a bearing journal of a defined length. Furthermore, the bearing journal of the present invention is easily rotatable in the side frame of the press assembly. This insures that the bearing journal can be rotated up to 360° which is always desirable when the wire strain gauges of two bearing journals cooperate in a bridge circuit.

During installation of the bearing journal, a single operator can easily manipulate the assembly from the outside of the press frame. This increases the adaptability and ease of installation and reduces the costs involved.

The two slidable wedges that exert the radially outwardly acting force on the annular clamping portion of the bearing journal have cooperating sloping faces of 15°. This makes them self-locking so that it is not possible for the journal bearing to become loose independently of an operator. This self-locking of the wedges can be overcome by the use of a threaded adjusting screw. This screw is easily backed off to remove the radially outwardly acting forces applied by the clamping wedges.

Since the bearing journals are easily positioned in the desired location in the press frames, the paper guide rollers will be accurately and properly positioned. This makes it virtually impossible to improperly locate the paper guide rollers so that untrue running of the paper web will not happen.

The bearing journal for a paper guide roller in accordance with the present invention overcomes the limitations of the prior art and is a substantial advance in the art.

BRIEF DESCRIPTION OF THE DRAWINGS

While the novel features of the bearing journals for paper guide rollers in accordance with the present invention are set forth with particularity in the appended claims, a full and complete understanding of the invention may be had by referring to the detailed description of the preferred embodiment which is presented subsequently, and as illustrated in the accompanying drawings in which:

FIG. 1 is a side elevation view, partly in cross-section of a preferred embodiment of a bearing journal for a paper guide cylinder roller in accordance with the present invention;

FIG. 2 is a cross-sectional view of a bearing journal taken along line I—I of FIG. 1 with the press frame side wall removed for clarity;

FIG. 3 is a top plan view of the bearing journal taken in the direction indicated by arrow A in FIG. 1 and with the press side frame and the paper guide roller omitted for clarity; and FIG. 4 is a top plan view of a portion of the bearing journal taken in the direction indicated by arrow B in FIG. 1 and with the cover for the wire strain gauges removed.

DESCRIPTION OF THE PREFERRED EMBODIMENT

Referring initially to FIG. 1 there may be seen a preferred embodiment of a bearing journal for a paper guide roller in accordance with the present invention. An elongated generally cylindrical bearing journal, generally at 1 is shown in FIG. 1 and an outer end of bearing journal 1 is received and held in a bore in a side wall 2 of a press frame in a manner as will be discussed in detail shortly. An inner end of bearing journal 1 is received in a roller bearing, generally at 4, of a paper guide roller 6. This inner end of the bearing journal has a reduced diameter portion, generally at 3, which is received in the roller bearing 4. This bearing 4 is preferably a self-aligning bearing assembly which has a cover disk 7 on the end face of the paper guide roller 6 and a spacer ring 8 on the axially inner side of the bearing 4. While not depicted in the drawings, it will be understood that a right end of the paper guide roller 6 is similar in structure and support to the left end which is shown in the drawings and that the right end will be supported by means of a similar bearing journal in the right wall of the printing press assembly.

The outboard portion of the bearing journal 1 which is located in the side wall 2 of the press frame has a clamping area, generally indicated at C in FIG. 1. This clamping area is expandable radially outwardly to cause the outer surface of the bearing journal to engage the wall of the bore in the side wall 2. A blind bore 9 extends axially inwardly into the bearing journal from an outer end of the bearing journal 1. Three circumferentially spaced, longitudinally extending, radially directed slits or slots 12, 13 and 14 extend out from the blind bore 9 to the outer surface of the bearing journal in the clamping area 6, as may be seen in FIGS. 1 and 2. These slits 12, 13 and 14 provide the annular portion of the bearing journal I which forms the clamping area C of the bearing journal with sufficient radial flex to facilitate its expansion so that the bearing journal outer walls will securely engage the bore in the side frame 2.

A pair of cooperating clamping wedges 16 and 17 are received in the blind bore 9, as may be seen in FIGS. 1 and 2. These wedges have generally planar coacting wedge faces that are each inclined with respect to the horizontal at an angle of inclination $\alpha$ that is approximately 15°. The outer surfaces of these wedges are cylindrical or arcuate and are sized to be complimentary with the periphery of the blind bore 9. As the wedges slide with respect to each other, their wedge faces cause their outer surfaces to move radially outwardly to thereby deflect the annular walls of the clamping area C of the bearing journal 1 outwardly into engagement with the side frame 2 so that a clamping force is applied to the side frame 2.

A first wedge 16 is placed in blind bore 9 with its end face 18 in contact with an inner end of the blind bore 9. The corresponding end face 19 of the second wedge 17 is directed toward the axial outer end of the bearing journal 1. The wedge faces of the wedges 16 and 17 are slidable with respect to each other by actuation of a pressure screw 21 which is received in internal threads 22 formed in the blind bore 9 adjacent the axially outer end of the bearing journal 1. The end face 19 of the second wedge 17 is engaged by this pressure screw 21. As the pressure screw is turned into the blind bore 9, the second wedge 19 tends to move into the blind bore. This causes the wedging faces of the two wedges 16 and 17 to slide with respect to each other since the end face 18 of the first wedge 16 is abutting the inner end of the blind bore 9. As the wedges 16 and 17 move with respect to each other, their inclined wedging faces act to expand the annular portions of the bearing journal 1 which forms the clamping area C radially outwardly. Since the wedging faces of the two wedges 16 and 17 are both inclined at a wedge angle α of generally 15° to the horizontal, the wedges 16 and 17 are self-locking.

If the bearing journal 1 is to be removed from the side frame 2 or needs to be loosened so that it can be rotated, the pressure screw 21 is initially backed off in the threaded portion 22 of the blind bore so that the wedge 17 can slide to the left or toward the axially outer end of the bearing journal 1. Since the wedges 16 and 17 are self-locking, the wedge 17 must be pulled axially outwardly. This is accomplished by the provision of an adjusting screw 24 that is received in a threaded bore 23 that extends axially along the centerline of pressure screw 21 and into a threaded bore 26 which is located in the end face 19 of the second wedge 17. The second wedge 17 is moved out of its clamping position by rotation of the adjusting screw 24 since the adjusting screw 24 rests on a support face 28 of the bore 23 and because of the rotary motion of the adjusting screw 24 for making an operational connection with the threaded bore 26 of the second wedge 17. As the second wedge 17 is moved axially outwardly in the blind bore 9, the clamping force exerted by the annular portion of the bearing journal 1 in the clamping area C is relaxed so that the bearing journal 1 can be rotated in, or removed from the side frames 2.

Turning now to FIG. 1, taken in conjunction with FIGS. 3 and 4, a pair of wire strain gauges 29 and 31 are disposed in the area D of the bearing journal in diametrically opposed recesses 32 and 33. As seen in FIG. 1, the area D is that portion of the bearing journal 1 which is between the side frame 2 and the paper guide roller 6. Each of these recesses 32 and 33 is formed in an outer casing 11 of the bearing journal 1. Bottom surfaces of the recesses 32 and 33 are parallel to each other. The recess 32 has soldering terminals 34 which are used to connect the contacts of the wire strain gauges 29 and 31 with the wires of an elongated cable 36. A pair of circumferential grooves 37 and 38 are provided on the periphery of the bearing journal 1 in the area D, as seen in FIGS. 1 and 4. These peripheral grooves connect the recesses 32 and 33 and form a wire channel in the casing 11 of the bearing journal 1. These grooves 37 and 38 are provided so that the wire leads from the wire strain gauge 31 in the recess 33 can be brought to the strain gauge 29 and thus be connected to the soldering terminals 34 and thence to the cable 36. This cable 36 is secured in the recess 32 by means of a cable strap 39 and an associated screw 41 which are shown in FIG. 4.

The cable 36 passes along the recess 32 in the area D and along one of the slots 12, 13, or 14 in the area C, as may be seen in FIGS. 1 and 3. A pair of short axially extending grooves 42 and 43 are formed in the casing 11 of the bearing journal 1 in the areas C1 and C2, as may be seen most clearly in FIG. 3. Thus the cable 36 from the wire strain gauges 29 and 31 can be led to a point at the axial outer end of the bearing journal 1. From this point, the cable 36 will be connected to suitable electrical measuring and indicating devices.

Once the wire strain gauges 29 and 31 have been placed in recesses 32 and 33 and their leads have been secured to the soldering terminals 34 and the wire cable 36 has been led through the cable strap 39 which is then secured in place by screw 41, the recesses 32 and 33 can be filled with a suitable insulating material. After this has been done, a protective cover 44, as seen most clearly in FIG. 3, will be placed about the bearing journal 1 in the area D.

As indicated above, the bearing journal 1 is connected via the cable 36 to suitable electrical devices which are not specifically shown. The electric cable 36 can be connected with a converter in which the electrical values from the wire strain gauges 29 and 31 are converted, indicated by means of display devices, and provided to a switching device. In case there are deviations in the measured values form a previously set nominal value for the paper web tension, this switching device could trigger an acoustical or optical warning signal so that a manual correction can be made. Alternatively, the signals could be delivered to a suitable computer control arrangement which could then make automatic corrections in the paper web tension. This latter possibility would clearly require a larger expenditure to provide the equipment necessary to effect such an adjustment of the paper web tension through the computer of the rotary printing press.

While a preferred embodiment of a bearing journal for a paper guide roller in accordance with the present invention has been set forth fully and completely hereinabove, it will be apparent to one of skill in the art that a number of changes in, for example the size of the paper guide roller, the thickness of the press side wall, the type of bearings used and the like could be made without departing from the true spirit and scope of the present invention which is accordingly to be limited only by the following claims.

What is claimed is:

1. A bearing journal assembly for a paper guide roller of a rotary printing press, said bearing journal assembly comprising:
   an elongated, generally cylindrical bearing journal having an axially outer end receivable in a side frame of a press and an axially inner end receivable in a roller;
   an elongated blind bore extending axially into said bearing journal from said axial outer end;
   a plurality of circumferentially disposed, axially extending, slits extending radially outwardly from said blind bore to an outer casing surface of said bearing journal;
   cooperating first and second clamping wedges slidably disposed with respect to each other in said blind bore; and
   means for sliding said first and second clamping wedges to radially expand and contact an annular clamping area of said journal bearing, said annular clamping area being defined by said blind bore and said slits.

2. The bearing journal assembly of claim wherein said bearing journal further includes spaced recesses intermediate said clamping area and said axially inner end, said recesses having generally parallel bottom surfaces adapted to receive wire strain gauges.

3. The bearing journal assembly of claim 2 further including wire strain gauges secured in said recesses.

4. The bearing journal assembly of claim 3 wherein said wire strain gauges are enclosed in an insulating material and further including a protective cover for said recesses.

5. The bearing journal assembly of claim 3 further including a cable for said wire strain gauges and wherein said cable passes through one of said plurality of slits.

6. The bearing journal assembly of claim 1 wherein said means for sliding said first and second clamping wedges includes a pressure screw receivable in an axially outer end portion of said blind bore an dengageable with an end face of one of said first and second clamping wedges to exert a clamping force.

7. The bearing journal assembly of claim 6 further including a bore in said pressure screw and an adjusting screw in said bore, said adjusting screw being usable to exert an unclamping force on said one of said first and second clamping wedges.

8. The bearing journal assembly of claim 7 wherein said adjusting screw is received in a threaded bore in said end face of said one of said first and second clamping wedges.

9. The bearing journal assembly of claim 1 wherein said first and second clamping wedges have cooperating inclined wedge faces.

10. The bearing journal assembly of claim 9 wherein said wedge faces are inclined at approximately 15° to the horizontal.

* * * * *